(12) United States Patent
Ward et al.

(10) Patent No.: US 8,560,963 B1
(45) Date of Patent: Oct. 15, 2013

(54) PROVIDING NOTIFICATIONS OF WIRELESS DATA CONSUMPTION IN A WIRELESS COMMUNICATION DEVICE

(75) Inventors: Jason N. Ward, Lee's Summit, MO (US); Tuan Q. Tran, Olathe, KS (US); Raymond Emilio Reeves, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 265 days.

(21) Appl. No.: 13/180,997

(22) Filed: Jul. 12, 2011

(51) Int. Cl.
*G06F 3/048* (2013.01)

(52) U.S. Cl.
USPC ........... 715/811; 715/789; 715/764; 715/744; 715/745; 715/763; 715/715; 715/772; 455/423; 455/566; 455/115.4; 455/226.4; 345/593; 345/619; 345/681

(58) Field of Classification Search
USPC ......... 715/705, 706, 710, 712, 745, 762–765, 715/771, 772, 781, 783, 788, 789; 455/423, 455/67.11, 115.1–115.4, 157.2, 158.1, 455/159.1, 226.1–226.4; 345/581, 589, 345/593, 619, 681, 400
See application file for complete search history.

(56) References Cited

U.S. PATENT DOCUMENTS

| | | | |
|---|---|---|---|
| 4,463,348 A | 7/1984 | Sidebottom | |
| 6,493,547 B1 | 12/2002 | Raith | |
| 8,055,752 B1 * | 11/2011 | Fong et al. | 709/224 |
| 8,271,899 B1 * | 9/2012 | Blackburn et al. | 715/789 |
| 8,296,726 B2 * | 10/2012 | Hoff | 717/105 |
| 8,386,948 B2 * | 2/2013 | Onda et al. | 715/766 |
| 2003/0142141 A1 | 7/2003 | Brown et al. | |
| 2005/0120306 A1 * | 6/2005 | Klassen et al. | 715/765 |
| 2005/0283727 A1 * | 12/2005 | Large | 715/711 |
| 2006/0253787 A1 * | 11/2006 | Fogg | 715/752 |
| 2008/0254429 A1 * | 10/2008 | Woolf et al. | 434/322 |
| 2010/0023874 A1 * | 1/2010 | Frohwein | 715/747 |
| 2010/0257059 A1 * | 10/2010 | Fujioka et al. | 705/14.66 |
| 2012/0032945 A1 * | 2/2012 | Dare et al. | 345/418 |
| 2012/0101952 A1 * | 4/2012 | Raleigh et al. | 705/304 |

* cited by examiner

*Primary Examiner* — Allahyar Kasraian

(57) ABSTRACT

A wireless communication device communicates with a data network in response to data access operations generated by a plurality of applications operating within the wireless communication device. The wireless communication device displays a plurality of framed icons based on icons individually associated with each of the applications and monitors the applications to determine a frequency and data throughput for the data access operations on a per-application basis. The wireless communication device processes the frequency to select numeric indicators on a per-application basis, processes the data throughput to select frame colors on a per-application basis, and directs the wireless communication device to display the framed icons with the selected frame colors and with bubbles having the numeric indicators.

20 Claims, 6 Drawing Sheets

US 8,560,963 B1

PROVIDING NOTIFICATIONS OF WIRELESS DATA CONSUMPTION IN A WIRELESS COMMUNICATION DEVICE

TECHNICAL BACKGROUND

Wireless communications have become increasingly prominent for sending and receiving information. For example, individuals may utilize a wireless communication device for voice communications, research, entertainment, or for conducting critical business transactions over a data network. Use of these services requires access to wireless voice and data networks.

Many wireless communication devices now include software applications, or "apps," that operate within the device to perform any number of tasks. These software applications may be built in, provided by a service provider, or provided by a third party. Unfortunately, these applications often utilize the limited resources available to the wireless communication device by operating in the device unbeknownst to a user. Thus, the user of the wireless communication device is unaware of the degree and frequency to which various applications utilize data.

Overview

A wireless communication device communicates with a data network in response to data access operations generated by a plurality of applications operating within the wireless communication device. The wireless communication device displays a plurality of framed icons based on icons individually associated with each of the applications and monitors the applications to determine a frequency and data throughput for the data access operations on a per-application basis. The wireless communication device processes the frequency to select numeric indicators on a per-application basis, processes the data throughput to select frame colors on a per-application basis, and directs the wireless communication device to display the framed icons with the selected frame colors and with bubbles having the numeric indicators.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
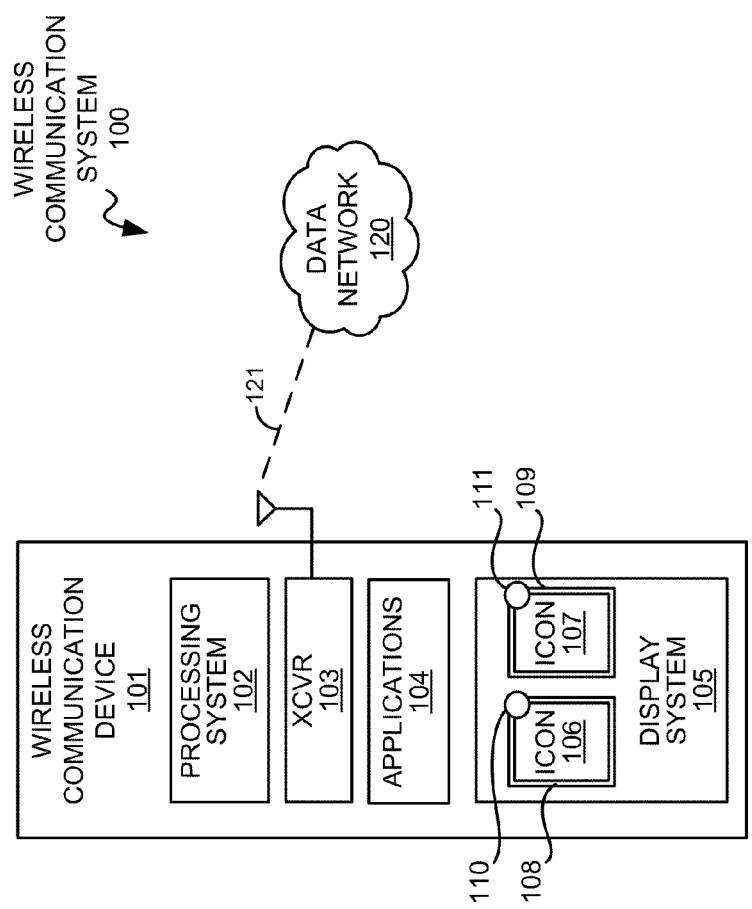
FIG. 1 illustrates a wireless communication device for providing notifications of wireless data consumption in a wireless communication system.

FIG. 1 illustrates wireless communication system 100. In particular, FIG. 1 illustrates wireless communication device 101 for providing notifications of wireless data consumption in wireless communication system 100. Wireless communication system 100 includes wireless communication device 101, wireless communication link 111, and data network 120. Wireless communication device 101 includes processing system 102, transceiver 103, applications 104, and display system 105. Applications 104 may include any number of applications which may be stored in a memory system. The memory system is not shown for simplicity.

Display system 105 displays or illustrates icons 106 and 107. Icons 106 and 107 are each associated with an individual application of applications 104. As shown, icon 106 has frame 108 and bubble 110. Similarly, application 107 has frame 109 and bubble 111. In this example, two icons with frames and bubbles are shown for simplicity. It is appreciated that any number of icons may be displayed, with or without frames and bubbles, by display system 105.

In operation, wireless communication device 101 communicates with data network 120 over wireless communication link 111. More specifically, wireless communication device 101 transfers data to, and receives data from, data network 120 over wireless communication link 111. The data comprises data transferred and received as a result of data access operations generated by individual applications of applications 104. Wireless communication device 101 monitors the data and/or data access operations and provides visual notifications of the frequency and quantity of wireless data consumption generated by each of applications 104.

Figure 2:
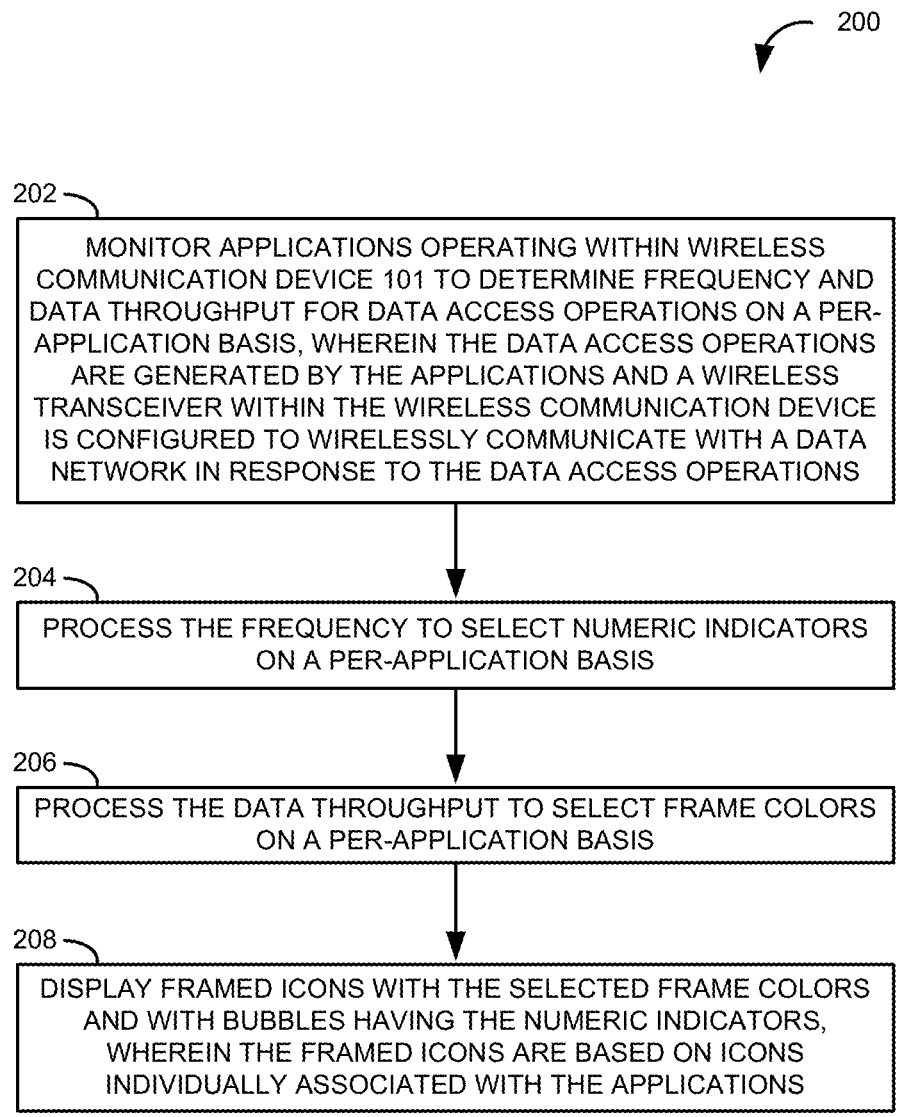
FIG. 2 illustrates operation of a wireless communication device for providing notifications of wireless data consumption.

FIG. 2 illustrates operation of wireless communication device 101 to provide notifications of wireless data consumption in wireless communication system 100. To begin, a wireless communication device monitors applications operating within the device to determine frequency and data throughput for data access operations on a per-application basis (202). The data access operations are generated by applications 104 and wireless transceiver 103 is configured to wirelessly communicate with data network 120 in response to the data access operations.

Applications 104 may be, for example, any program or collection of programs configured to transfer data to, and/or receive data from, data network 120. In this example, the application associated with icon 106 may be, for example, a news application configured to generate a number of requests for the latest news from data network 120. Likewise, the application associated with icon 107 may be, for example, a location application configured to generate a number of requests to transfer the current location of wireless communication device 101 to data network 120. Thus, the data access operations may comprise data requests and/or data transfers. Processing system 102 monitors the news application and the location application to determine the frequency and data throughput for the data access operations for each application. It is appreciated that some applications may never generate data access operations without user intervention while others may generate data access operations continuously, periodically, randomly, based on some event, based on some user intervention, or the like, including combinations and variations thereof.

The wireless communication device processes the frequency to select numeric indicators on a per-application basis (204). The numeric indicators may, for example, indicate the number of times that each of the applications attempted to transfer data to and/or receive data from data network 120 within a specified time period. In this example, processing system 102 processes the frequency for data access operations on a per-application basis for the news application and the location application. The wireless communication device processes the data throughput to select frame colors on a per-application basis (206). The frame colors may, for example, indicate a level or quantity of data throughput.

Lastly, the wireless communication device displays framed icons with the selected frame colors and with bubbles having the numeric indicators (208). The framed icons are based on icons individually associated with the applications. In this example, icon 106 including frame 108 resulting in a framed icon. Similarly, icon 107 includes frame 109 resulting in another framed icon. Icons 106 and 107 also include bubbles 108 and 109, respectively, having the numeric indicators. The framed icons and bubbles are displayed by display system 105 which may comprise, for example, any monitor or screen capable of displaying or illustrating the framed icons to a user of wireless communication device 101.

Figure 3:
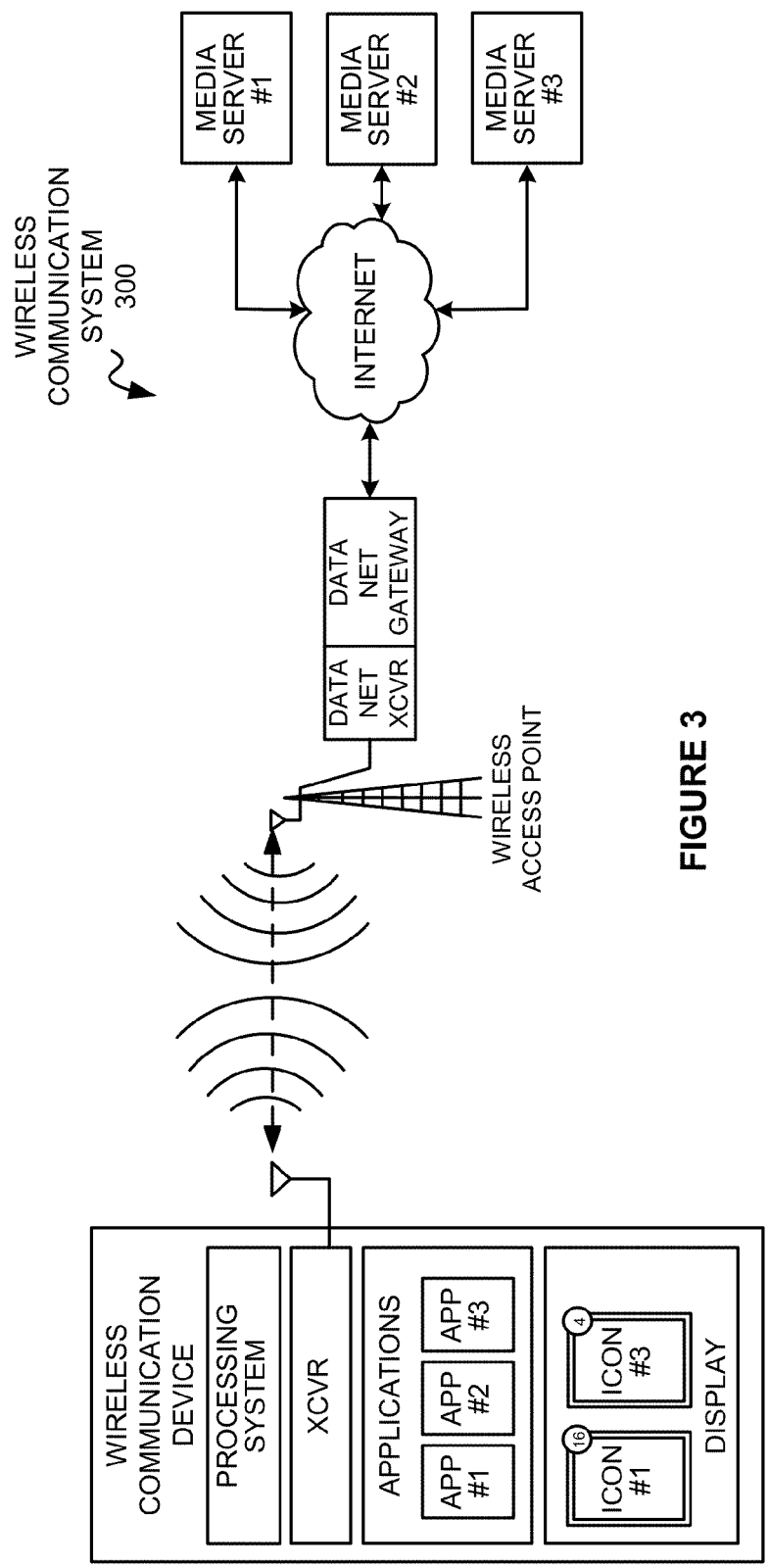
FIG. 3 illustrates a wireless communication device for providing notifications of wireless data consumption in a wireless communication system.

FIG. 3 illustrates wireless communication system 300. In particular, FIG. 3 illustrates wireless communication device 301 for providing notifications of wireless data consumption in wireless communication system 300. Wireless communication system 300 includes a wireless communication device, a wireless access point, and a wireless data network. The wireless data network includes a data network transceiver, a data network gateway, a data communication network (INTERNET), and media servers #1, #2, and #3. It is appreciated that data servers #1, #2, and #3 may be considered part of the data communication network in some instances.

Although not shown for simplicity, wireless communication system 300 may also include a wireless voice network. Typically, the wireless data network and the wireless voice network share the wireless access point. The wireless data network and the wireless voice network are discrete systems with separate transceivers and antennas at the wireless access point. Thus, the data network and the voice network each has radio frequency circuitry mounted on the same physical structure. The wireless data network provides packet access to the Internet and to other data systems, such as email systems, media servers, and the like. The wireless voice network provides voice calling and text messaging. Although other network types could be used, the wireless voice network could be a Code Division Multiple Access (CDMA) 1x telephony network and the data network could be an Evolution Data-Only (EVDO) Internet access network.

The wireless access point comprises access systems, network elements and communication links. The wireless access point may include one or more wireless base stations, network access points, gateways, routers, switches, call processors, servers, communication links, and the like. The wireless access point comprises a computer and communication systems that include processing circuitry, memory, software, and network communication interfaces. The wireless access point may also include gateways, routers, servers, call processors, communication links, and other communication network elements.

The wireless communication device includes a processing system, a wireless transceiver, applications, and a display. As shown, the applications include applications APP #1, APP #2, and APP #3. It is appreciated that the applications may comprise any software program or collection of programs capable of operating within the wireless communication device. By way of example, applications APP #1, APP #2, and APP #3 may comprise, but are not limited to, mapping applications, market applications, locations applications, media and/or music applications, memo applications, backup applications, and editing applications—including combinations and/or variations thereof. Each of the applications APP #1, APP #2, and APP #3 may be individually associated with an icon displayed to a user within the display.

The display may comprise, for example, a screen or a touch screen, although other systems are also possible. The display includes a main display area or desktop area of the display that represents an area of the display that is typically visible to a user of the wireless communication device by default. A user can adjust or modify the icons that are illustrated or displayed to the user in the main area based on individual preferences. For example, if a user of the wireless communication device uses a mapping application often, then that user may want an icon associated with the mapping application visible for easy selection of that application. A user may select the icon, and thus launch the application, in any number of ways. For instance, if the wireless communication device includes a touch screen display, then the application may be launched in response to a user touching the icon in the main display area.

In this example, ICON #1 and ICON #3 are displayed in a main display area or desktop area of the display of the wireless communication device. ICON #1 is associated with application APP #1 and ICON #3 is associated with application APP #3. Each of applications APP #1, APP #2, and APP #3 may attempt to access the data network through a series of data access operations. The processing system is configured to monitor the applications to determine frequency and data throughput for the data access operations on a per-application basis, process the frequency to select numeric indicators on a per-application basis, process the data throughput to select frame colors on a per-application basis, and direct the display system to display the framed icons with the selected frame colors and with bubbles having the numeric indicators.

Figure 4B:
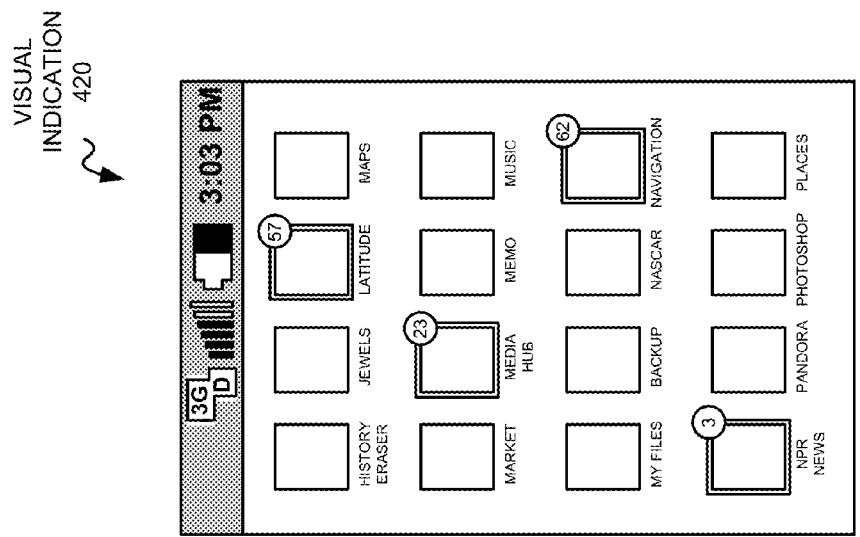
FIGS. 4A and 4B illustrate a wireless communication device for providing notifications of wireless data consumption in a wireless communication system.
Figure 4A:
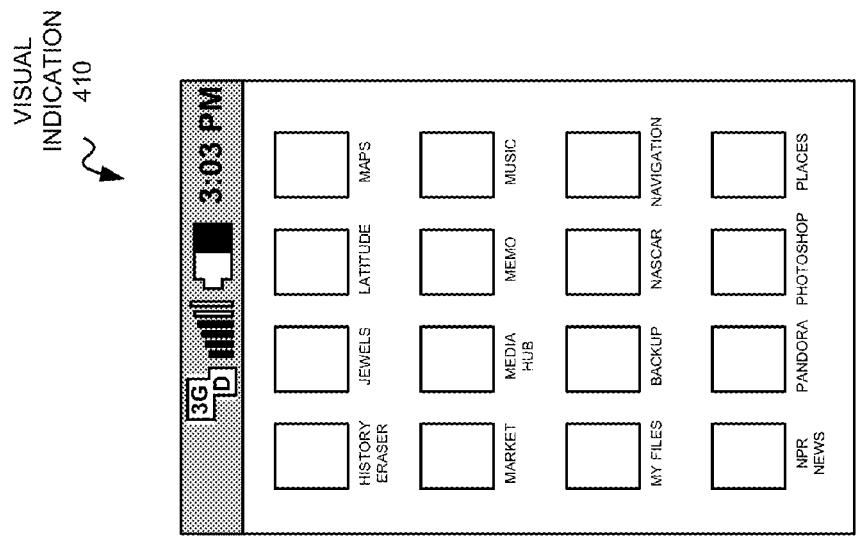

FIGS. 4A and 4B illustrate visual indications 410 and 420 of a wireless communication device for providing notifications of wireless data consumption in a wireless communication system. More specifically, respective visual indications 410 and 420 comprise frontal views of a main display area or desktop area of a display of a wireless communication device prior to, and after, a period of time has elapsed.

Referring first to FIG. 4A, which illustrates a frontal view of a main display area or desktop area of the display of the wireless communication device prior to a first period of time elapsing. In this example, the display comprises a touch screen. The display includes a main display area or desktop area of the display that represents an area of the display that is typically visible to a user of the wireless communication device by default. A user can adjust or modify the icons that are illustrated or displayed to the user in the main area based on individual preferences. A user may select the icon, and thus launch the application, in any number of ways. For instance, an application may be launched in response to a user touching the icon in the main display area of the touch screen.

Visual indication 410 indicates a number of icons associated with applications. In this example, the applications include a history eraser icon, a jewels icon, a latitude icon, a maps icon, a market icon, a media hub icon, a memo icon, a music icon, a my files icon, a backup icon, a nascar icon, a navigation icon, an npr news icon, a Pandora icon, a photoshop icon, and a places icon. It is appreciated that more or fewer icons may be displayed to a user within the main display area or desktop area of the display of the wireless communication device. Moreover, it is also appreciated that all of the applications stored within the wireless communication device, and thus capable of operating within the wireless communication device, may not be displayed within the main display area or desktop area of the display of the wireless communication device.

As previously discussed, each icon is associated with an application within the wireless communication device and each application may attempt to access the data network through a series of data access operations. The wireless communication device is configured to monitor the applications to determine frequency and data throughput for the data access operations on a per-application basis, process the frequency to select numeric indicators on a per-application basis, process the data throughput to select frame colors on a per-application basis, and direct the display system to display the framed icons with the selected frame colors and with bubbles having the numeric indicators.

In this example, the wireless communication device determines frequency and data throughput for the data access operations on a per-application basis during each of a plurality of successive time intervals. Each time interval may comprise a period of time which may be user configurable in some examples. A time interval may comprise an hour, a day, a week, a month, or the like. It is appreciated that the time intervals may comprise any useful amount of time during which the wireless communication device can gather frequency and data throughput information for the data access operations generated by the applications operating within the wireless communication device.

The wireless communication device then displays the framed icons with the selected frame colors and with bubbles having the numeric indicators at the end of each time interval. In this example, visual indication 410 indicates the icons displayed to a user on a main display area or desktop area of the display of the wireless communication device prior to a first time interval. Visual indication 420 of FIG. 4B indicates the icons, including the framed icons, displayed to a user on a main display area or desktop area of the display of the wireless communication device after the first time interval.

For example, FIG. 4B illustrates a frontal view of a main display area or desktop area of the display of the wireless communication device after the first period of time (or time interval) elapsing. Of the plurality of icons previously displayed on the main display area or desktop area of the display of the wireless communication device, four of the icons are now displayed with frames and bubbles in visual indication 420.

As discussed, the wireless communication device processes the data throughput during the time interval to select frame colors on a per-application basis and processes the frequency to select numeric indicators on a per-application basis. In some examples, the colors may be selected for each of the applications to indicate data consumption of each of the applications during the previous time interval. In other examples, the colors may be selected for each of the applications to indicate a running average of data consumption by each of the applications calculated as of the end of the previous time interval. It is appreciated that other examples are also possible, including combinations and/or variations of the above examples.

Regardless of whether the color indicates a running average throughput calculated at the end of the previous interval and/or a total throughput during the previous interval, in some examples, the actual colors are selected based on various thresholds. The thresholds may be set to default values initially and be configurable by the user and/or a service provider. Moreover, the thresholds may be determined on a per-application basis based on the type of application. For example, an email application is expected to access more data than, for example, a news application, and thus the one or more thresholds for the email application may be individually set to higher values to reflect the expected additional throughput and accesses.

Although not shown, the wireless communication device may be configured to select a green frame color if the data throughput during a previous time interval is greater than zero but less than a first threshold, select a yellow frame color if the data throughput during the previous time interval is greater than or equal to the first threshold but less than a second threshold, and select a red frame color if the data throughput during the previous time interval is greater than or equal to the second threshold. It is appreciated that other color combinations are also possible. For example, the colors that indicate data throughput may be user configurable.

In some examples, the frequency of data accesses for each of the applications indicates the number of data accesses by each of the application during the previous time interval. In other examples, the frequency for each of the data applications indicates a running average of the number of data accesses by each of the applications calculated as of the end of the previous time interval. It is appreciated that other examples are also possible, including combinations and/or variations of the above examples. It is also appreciated that the frequency of data accesses does not necessarily reflect data throughput as one data access may comprise a large amount of data and many accesses may each comprise a very small amount of data.

As shown in this example, the frame colors (not shown) of the icons indicate a total throughput during the previous interval. The icons associated with the latitude application, the media hub application, the navigation application, and the npr news application include frames indicating that each of these applications has requested data. As discussed above, the frame colors indicate the amount or quantity of throughput that each of the applications has requested during the previous interval. Additionally, the icons associated with the latitude application, the media hub application, the navigation application, and the npr news application include bubbles indicating the frequency of data access operations for each of the applications. In this example, the latitude application has generated fifty-seven data requests to the data network, the media hub application has generated twenty-three data requests, the navigation application has generated sixty-two data requests, and the npr news application has generated three data requests.

Figure 5B:
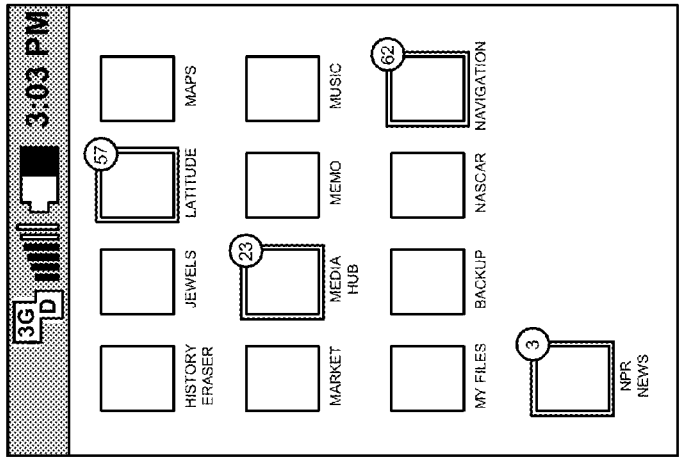
FIGS. 5A and 5B illustrate a wireless communication device for providing notifications of wireless data consumption in a wireless communication system.
Figure 5A:
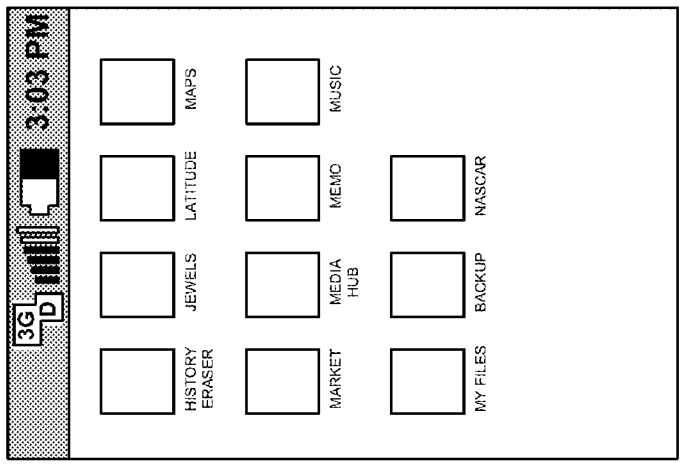

FIGS. 5A and 5B illustrate visual indications 510 and 520 of a wireless communication device for providing notifications of wireless data consumption in a wireless communication system. More specifically, respective visual indications 510 and 520 comprise frontal views of a main display area or desktop area of a display of a wireless communication device prior to, and after, a period of time has elapsed.

While similar to visual indications 410 and 420 of FIGS. 4A and 4B, respectively, visual indications 510 and 520 illustrate an example whereby icons that are not currently displayed within the main display area or desktop area of the display of the wireless communication device are then automatically displayed within the main display area or desktop area of the display of the wireless communication device. The icons may be identified and automatically displayed based on the associated applications accessing the data network through a series of data access operations during the previous time interval.

In this example, visual indication 520 illustrates that the icons associated with the latitude application, the media hub application, the navigation application, and the npr news application include frames indicating that each of these applications has requested data during the previous time interval. As shown in visual indication 510 of FIG. 5A, icons associated with the navigation application and the npr news application are not displayed within the main display area or desktop area of the display of the wireless communication device prior to a period of time elapsing. However, after the period of time has elapsed, visual indication 520 illustrates that these icons are automatically displayed within the main display area or desktop area of the display of the wireless communication device.

In some examples, the wireless communication device may remove the icons associated with the navigation application and the npr news application (i.e., the icons not displayed within the main display area or desktop area of the display of the wireless communication device prior to a period of time elapsing) after a timeout period. It is appreciated that the timeout period may be shorter than a time interval. In other examples, the wireless communication device may remove the icons associated with the navigation application and the npr news application in response to receiving an indication from a user interface within the wireless communication device. For example, a user may notice that the navigation application, which was not previously displayed (visual indication 510), is now displayed (visual indication 520), and subsequently touch the icon on the display or otherwise indicate to remove the icons from the main display area or desktop area of the display of the wireless communication device. It is appreciated that other user responses are also possible to remove the icon. For example, the user may issue a voice command to remove the icon.

Additionally, in some examples, the wireless communication device may give the user the option to uninstall or delete the application. This option may be given to a user of the wireless communication device any time that an icon associated with an application includes a frame. In this manner, a user may delete an application or remove the application from the wireless communication device if the user discovers that the application is using too much data throughput and/or accessing the network too frequently.

Figure 6:
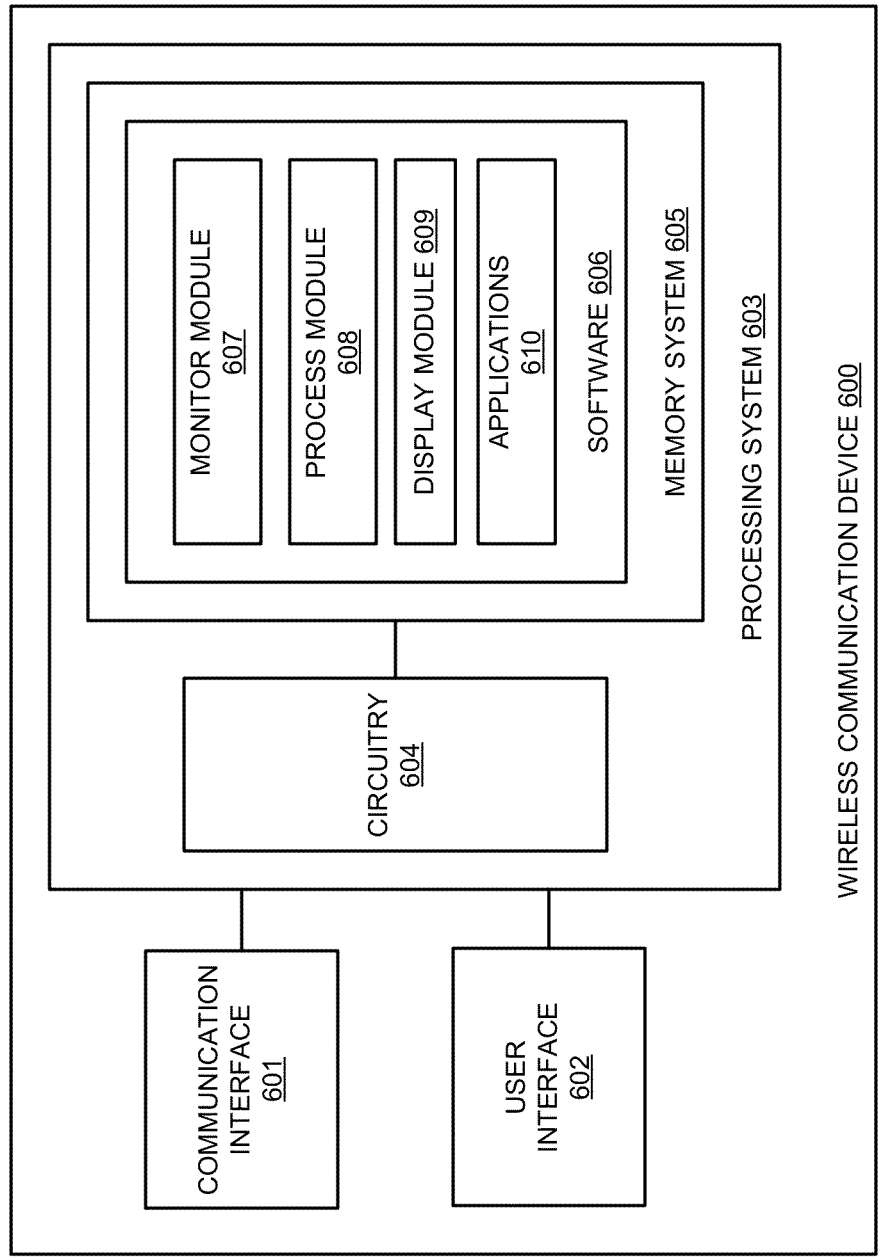
FIG. 6 illustrates a wireless communication device for providing notifications of wireless data consumption in a wireless communication system.

FIG. 6 illustrates wireless communication device 600. Wireless communication device 600 provides an example of wireless communication device 101 of FIG. 1 and the wireless communication device of FIG. 3, although these systems may use alternative configurations. Wireless communication device 600 comprises communication interface 601, user interface 602, and processing system 603. Processing system 603 is linked to communication interface 601 and user interface 602. Processing system 603 includes processing circuitry 604 and memory system 605 that stores operating software 606. Operating software 606 comprises software modules 607-610.

Communication interface 601 comprises components that communicate over communication links, such as network cards, ports, RF transceivers, processing circuitry and software, or some other communication devices for communicating with wireless access points, such as with the wireless access point of FIG. 3. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof. User interface 602 comprises components that interact with a user. User interface 602 may include a keyboard, display screen, mouse, touch pad, or some other user input/output apparatus.

Processing circuitry 604 comprises microprocessor and other circuitry that retrieves and executes operating software 606 from memory system 605. Processing circuitry 604 may comprise single device or be distributed across multiple devices—including devices in different geographic areas. Processing circuitry 604 may be embedded in various types of equipment.

Memory system 605 comprises a non-transitory storage medium, such as a disk drive, flash drive, data storage circuitry, or some other memory apparatus. Memory system 605 may comprise single device or be distributed across multiple devices—including devices in different geographic areas. Memory system 605 may be embedded in various types of equipment.

Operating software 606 comprises computer programs, firmware, or some other form of machine-readable processing instructions. Operating software 606 may include an operating system, utilities, drivers, network interfaces, applications, or some other type of software. In this example, operating software 606 also comprises software modules 607-610, although software 606 could have alternative configurations. When executed by processing circuitry 604, operating software 606 directs processing system 603 to operate as described herein.

In particular, when executed by wireless communication device 600, monitor module 607 directs wireless communication device 600 to monitor applications 610 operating within wireless communication device 600 to determine frequency and data throughput for data access operations on a per-application basis, process module 608 directs wireless communication device 600 to process the frequency to select numeric indicators on a per-application basis and process the data throughput to select frame colors on a per-application basis, and display module 609 directs wireless communication device 600 to display framed icons with the selected frame colors and with bubbles having the numeric indicators, wherein the framed icons are based on icons individually associated with the applications.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 could be a telephone, transceiver, mobile phone, cellular phone, smartphone, computer, personal digital assistant (PDA), e-book, game console, mobile Internet device, wireless network interface card, media player, or some other wireless communication apparatus—including combinations thereof.

Wireless network protocols that may be utilized by wireless communication devices 101-103 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and data network 120.

Wireless communication link 121 uses the air or space as the transport media. Communication link 121 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

Data network 120 comprises RF communication circuitry and antennas located at wireless access points (not shown). Some examples of wireless access points include a base transceiver station (BTS), base station controller (BSC), radio base station (RBS), Node B, enhanced Node B (eNode B), and others. The RF communication circuitry typically includes amplifiers, filters, RF modulators, and signal processing circuitry and software. Data network 120 may also comprise routers, servers, memory devices, software, processing circuitry, cabling, power supplies, network communication interfaces, structural supports. Wireless network protocols that may be utilized by data network 120 includes CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Communication links within data network 120 (not shown) use metal, air, space, optical fiber such as glass or plastic, or some other material as the transport medium—including combinations thereof. Communication links within data network 120 could use various communication protocols, such as TDM, IP, Ethernet, telephony, optical networking, hybrid fiber coax (HFC), communication signaling, wireless protocols, or some other communication format—including combinations thereof. Communication links within data network 120 may be direct links or could include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device to provide visual notifications of wireless data consumption, the wireless communication device comprising:
    a wireless transceiver configured to wirelessly communicate with a data network in response to data access operations generated by a plurality of applications operating within the wireless communication device;
    a display system configured to display a plurality of framed icons based on icons individually associated with the plurality of applications; and
    a processing system configured to monitor the plurality of applications to determine frequency and data throughput for the data access operations on a per-application basis, process the frequency to select numeric indicators on a per-application basis, process the data throughput to select frame colors on a per-application basis, and direct the display system to display the plurality of framed icons with the selected frame colors and with bubbles having the numeric indicators.

2. The wireless communication device of claim 1 wherein the display system is not currently displaying one of the icons individually associated with the plurality of applications and the processing system is configured to process the data throughput to frame the one of the icons and direct the display system to display the framed one of the icons in a user configurable desktop area of the wireless communication device.

3. The wireless communication device of claim 2 wherein the processing system is configured to direct the display system to remove the framed one of the icons from the user configurable desktop area of the wireless communication device after a period of time.

4. The wireless communication device of claim 2 wherein the processing system is configured to direct the display system to remove the framed one of the icons from the user configurable desktop area of the wireless communication device in response to receiving an indication from a user interface within the wireless communication device.

5. The wireless communication device of claim 1 wherein the processing system is configured to determine the frequency and the data throughput for the data access operations on a per-application basis during each of a plurality of successive time intervals.

6. The wireless communication device of claim 5 wherein the processing system is configured to determine a running average frequency and a running average data throughput for the data access operations on a per-application basis during each of the plurality of successive time intervals.

7. The wireless communication device of claim 5 wherein the processing system is configured to select a green frame color if the data throughput during a previous time interval is greater than zero but less than a first threshold.

8. The wireless communication device of claim 7 wherein the processing system is configured to select a yellow frame color if the data throughput during the previous time interval is greater than or equal to the first threshold but less than a second threshold.

9. The wireless communication device of claim 7 wherein the processing system is configured to select a red frame color if the data throughput during a previous time interval is greater than or equal to the second threshold.

10. The wireless communication device of claim 9 wherein the first threshold and the second threshold are determined on a per-application basis based on a type of application.

11. A non-transitory computer readable medium having programming instructions stored thereon for providing visual notifications of wireless data consumption by a wireless communication device that, when executed by the wireless communication device, direct the wireless communication device to:
    monitor a plurality of applications operating within the wireless communication device to determine frequency and data throughput for data access operations on a per-application basis, wherein the data access operations are generated by the plurality of applications and a wireless transceiver within the wireless communication device is configured to wirelessly communicate with a data network in response to the data access operations;
    process the frequency to select numeric indicators on a per-application basis;
    process the data throughput to select frame colors on a per-application basis; and
    display a plurality of framed icons with the selected frame colors and with bubbles having the numeric indicators, wherein the plurality of framed icons are based on icons individually associated with the plurality of applications.

12. The non-transitory computer readable medium of claim 11 wherein the wireless communication device is not currently displaying one of the icons individually associated with the plurality of applications, and the programming instructions, when executed by the wireless communication device, direct the wireless communication device to process the data throughput to frame the one of the icons and display the framed one of the icons in a user configurable desktop area of the wireless communication device.

13. The non-transitory computer readable medium of claim 12 wherein the programming instructions, when executed by the wireless communication device, direct the wireless communication device to remove the framed one of the icons from the user configurable desktop area of the wireless communication device after a period of time.

14. The non-transitory computer readable medium of claim 12 wherein the programming instructions, when executed by the wireless communication device, direct the wireless communication device to remove the framed one of the icons from the user configurable desktop area of the wireless communication device in response to receiving an indication from a user interface within the wireless communication device.

15. The non-transitory computer readable medium of claim 11 wherein the programming instructions, when executed by the wireless communication device, direct the wireless communication device to determine the frequency and the data throughput for the data access operations on a per-application basis during each of a plurality of successive time intervals.

16. The non-transitory computer readable medium of claim 15 wherein the programming instructions, when executed by the wireless communication device, direct the wireless communication device to determine a running average frequency and a running average data throughput for the data access operations on a per-application basis during each of the plurality of successive time intervals.

17. The non-transitory computer readable medium of claim 15 wherein the programming instructions, when executed by the wireless communication device, direct the wireless communication device to select a green frame color if the data throughput during a previous time interval is greater than zero but less than a first threshold.

18. The non-transitory computer readable medium of claim 17 wherein the programming instructions, when executed by the wireless communication device, direct the wireless communication device to select a yellow frame color if the data throughput during the previous time interval is greater than or equal to the first threshold but less than a second threshold.

19. The non-transitory computer readable medium of claim 18 wherein the programming instructions, when executed by the wireless communication device, direct the wireless communication device to select a red frame color if the data throughput during a previous time interval is greater than or equal to the second threshold.

20. The non-transitory computer readable medium of claim 19 wherein the first threshold and the second threshold are determined on a per-application basis based on a type of application.

\* \* \* \* \*